(12) United States Patent
Crowell et al.

(10) Patent No.: US 6,896,232 B2
(45) Date of Patent: *May 24, 2005

(54) QUICK CLAMP AND QUICK RELEASE DEVICE

(76) Inventors: Mike L. Crowell, 9750 N. Monterey Dr., Unit #84, Fountain Hills, AZ (US) 85268; Don R. Lindebak, 4614 S. Parkside Dr., Tempe, AZ (US) 85282

( * ) Notice: Subject to any disclaimer, the term of this patent is extended or adjusted under 35 U.S.C. 154(b) by 0 days.

This patent is subject to a terminal disclaimer.

(21) Appl. No.: 10/749,013

(22) Filed: Dec. 30, 2003

(65) Prior Publication Data

US 2004/0169119 A1 Sep. 2, 2004

Related U.S. Application Data

(60) Provisional application No. 60/448,650, filed on Feb. 18, 2003.

(51) Int. Cl.$^7$ .................................................. A47G 1/10
(52) U.S. Cl. .................. 248/316.4; 70/14; 248/229.12; 248/229.22
(58) Field of Search ................... 248/316.4, 309.1, 248/316.1, 316, 229.12, 229.22, 228.3; 70/14, 18, 19, 58, 62

(56) References Cited

U.S. PATENT DOCUMENTS

| | | |
|---|---|---|
| 2,312,955 A | 3/1943 | Cambum |
| 2,472,022 A | 5/1949 | Neal |
| 2,735,323 A | 2/1956 | Phillips |
| 2,947,333 A | 8/1960 | Johnson |
| 4,057,239 A | 11/1977 | Hopf et al. |
| 4,874,155 A | 10/1989 | Goul |
| 4,893,801 A | 1/1990 | Flinn |
| 4,893,810 A | 1/1990 | Lee |
| D334,524 S | 4/1993 | Pinkney |
| 5,217,213 A | 6/1993 | Lii |
| 5,282,303 A | 2/1994 | Schriever |
| 5,287,972 A * | 2/1994 | Saathoff ...................... 211/64 |
| 5,568,916 A | 10/1996 | Gibbons et al. |
| D376,970 S | 12/1996 | Drake |
| 5,626,263 A | 5/1997 | Lii |
| 5,709,372 A | 1/1998 | Lii |
| 5,732,936 A | 3/1998 | Lii |
| 5,996,736 A * | 12/1999 | Stankiewicz ................ 182/127 |
| 2002/0190176 A1 * | 12/2002 | Louh ....................... 248/316.4 |

* cited by examiner

*Primary Examiner*—Ramon O Ramirez
(74) *Attorney, Agent, or Firm*—Ellis & Venable, P.C.; Joseph R. Meaney (57) ABSTRACT

The quick clamp and quick release device is incorporated in a clamp that can quickly clamp and release an object between two plates. The quick clamp and quick release device enables a user to quickly clamp an object with one hand and without the need for mechanical assistance to increase the clamping pressure on the clamped object like a screw clamp or a ratcheting clamp. The quick clamp and quick release device enables a user to quickly clamp and release objects such as bicycles, shotguns and other objects without damaging those objects in the clamping process. The clamp can be mounted to a wall, table or other structure to provide a convenient and easy way to store and mount objects.

20 Claims, 8 Drawing Sheets

QUICK CLAMP AND QUICK RELEASE DEVICE

CROSS-REFERENCE TO RELATED APPLICATION

The present application claims priority to copending U.S. provisional application entitled "Mobile Storage System For Weapons and Weapon Accessories," having Ser. No. 60/448,650, filed by inventors Mike L. Crowell and Don R. Lindebak on Feb. 18, 2003, which is entirely incorporated herein by reference.

FIELD OF THE INVENTION

The present invention relates generally to clamping devices and, more specifically, to clamping devices with quick clamping and quick releasing capabilities.

BACKGROUND OF THE INVENTION

There are many types of clamping devices. Prior clamping devices have been disclosed in the following United States patents: U.S. Pat. No. 2,312,955 (E A Camburn), U.S. Pat. No. 2,472,022 (E C Neal), U.S. Pat. No. 2,735,323 (T D Phillips), U.S. Pat. No. 2,947,333 (A L Johnson), U.S. Pat. No. 4,057,239 (H Hopf et al.), U.S. Pat. No. 4,874,155 (A S Goul), U.S. Pat. No. 4,893,801 (R W Flinn), U.S. Pat. No. D334,524 (K P Pinkney), U.S. Pat. No. 5,217,213 (L Lii), U.S. Pat. No. 5,282,303 (F G Schriever), U.S. Pat. No. 5,568,916 (R R Gibbons et al.), U.S. Pat. No. D376,970 (J Drake), U.S. Pat. No. 5,626,263 (L Lii), U.S. Pat. No. 5,709,372 (L Lii), U.S. Pat. No. 5,732,936 (L Lii). None, however, disclose the aspects of the current invention.

SUMMARY OF THE INVENTION

The invention is summarized below only for purposes of introducing embodiments of the invention. The ultimate scope of the invention is to be limited only to the claims that follow the specification.

The invention is incorporated in a clamp that can quickly clamp and release an object between two plates. The invention enables a user to quickly clamp an object with one hand and without the need for mechanical assistance to increase the clamping pressure on the clamped object like a screw clamp or a ratcheting clamp. The invention enables a user to quickly clamp and release a variety of objects including bicycles, tennis rackets, shovels, rakes, fishing rods, shotguns, rifles, flashlights and other objects without damaging those objects in the clamping process. The clamp can be mounted to a wall, table or other structure to provide a convenient and easy way to store and mount objects.

Generally, the clamp comprises a frame, a sliding plate, two alignment rods, a closing rod, and a rod-locking assembly. Preferably, the frame is a rectangular tube shape having four sides and two tube ends, wherein the first of the four sides (herein, the "first opposing side") projects out from the first tube end in a plane substantially parallel to the first opposing side to form a fixed plate, which acts as one of the two clamping plates. In other words, the fixed plate is connected to the frame near the first tube end and protrudes from the frame.

The sliding plate is housed within the frame and projects outward from the first tube end, preferably in amount equivalent to the amount the fixed plate extends from the first opposing side. The ends of the two alignment rods are connected to the first opposing side and the second of the four sides (herein, the "second opposing side") and positioned roughly perpendicular to the opposing sides. The sliding plate has two holes for the two alignment rods and moves between the first opposing side and the second opposing side along the two alignment rods.

The closing rod is connected to the sliding plate and slidably passes through the second opposing side. It is preferred that the closing rod be substantially parallel to the alignment rods and positioned between the two alignment rods. The rod-locking assembly has at least a first position and a second position and connects to the closing rod. The first position allows the closing rod to move the sliding plate both toward and away from the fixed plate and the second position allows the closing rod to move the sliding plate only toward the fixed plate. The clamp also includes a releasing spring to move the sliding plate back to the open position upon the release of the rod-locking assembly from the closing rod.

The description of the invention that follows, together with the accompanying drawings, should not be construed as limiting the invention to the example shown and described, because those skilled in the art to which this invention appertains will be able to devise other forms thereof within the ambit of the appended claims.

DESCRIPTION OF PREFERRED EMBODIMENTS

It is to be understood that the descriptions below are merely illustrative of the presently preferred embodiments of the invention and that no limitations are intended to the detail of construction or design herein shown other than as defined in the appended claims. In this specification, the term "rod-locking collar" refers to any device that can be placed on a rod and locked to prevent the collar from moving along the rod. An example of a preferred rod-locking collar can be found on the website published by Newman Tools, Inc. at www.newmantools.com/gripfast/, which Newman Tools, Inc. offers for sale under the trademark GRIP FAST.

As shown in the attached figures (e.g., FIGS. 1, 2, 4, and 8–13), the clamp 5 generally comprises a frame 10, a sliding plate 20, two alignment rods 26, 28, a closing rod 32, and a rod-locking assembly 40. It is preferred that the frame 10 take the shape of a rectangular tube, having a first opposing side 12, a second opposing side 14, a first tube end 16, a second tube end 18, and a fixed plate 24. Preferably, the fixed plate 24 is an extension of the first opposing side 12 beyond the first tube end 16 of the frame 10. The fixed plate 24 can be connected to the frame 10 near the first tube end 16 and protrudes from the frame 10 in a plane substantially parallel to the opposing sides 12, 14 (the first opposing side 12 and the second opposing side 14 are sometimes collectively referred to herein as the "opposing sides"). It is preferred to cast the frame 10 and the fixed plate 24 from metal as one piece. It is also preferred that the frame 10 and fixed plate 24 be approximately ⅛ inch thick.

The first alignment rod 26 and the second alignment rod 28 (the first alignment rod 26 and the second alignment rod 28 are sometimes collectively referred to herein as the "two alignment rods") are connected to the opposing sides 12, 14 and aligned roughly perpendicular to the opposing sides 12, 14. It is preferred that the first opposing side 12 and the second opposing side 14 be substantially parallel to each other.

The sliding plate 20 is oriented in a plane substantially parallel to the fixed plate 24. The sliding plate 20 has holes for the two alignment rods 26, 28 that permit the sliding plate 20 to slidably pass over the two alignment rods 26, 28. The two holes of the sliding plate 20 should be marginally bigger than the outside diameter of each alignment rod 26, 28 so that the sliding plate 20 can slide over the alignment rods. Inserting a flange bushing, preferably from teflon or similar material, into each of the two holes of the sliding plate 20 assists in a smooth sliding of the sliding plate 20 over the alignment rods 26, 28. It is has been found that using an alignment rod of ¼ inch diameter, a hole in the sliding plate 20 of 5/16 inch diameter, and using a flange busing having a cylindrical wall thickness of 1/16 inch permits the sliding plate 20 to slide but not have too much "play" on the alignment rods 20, 22.

Figure 1:
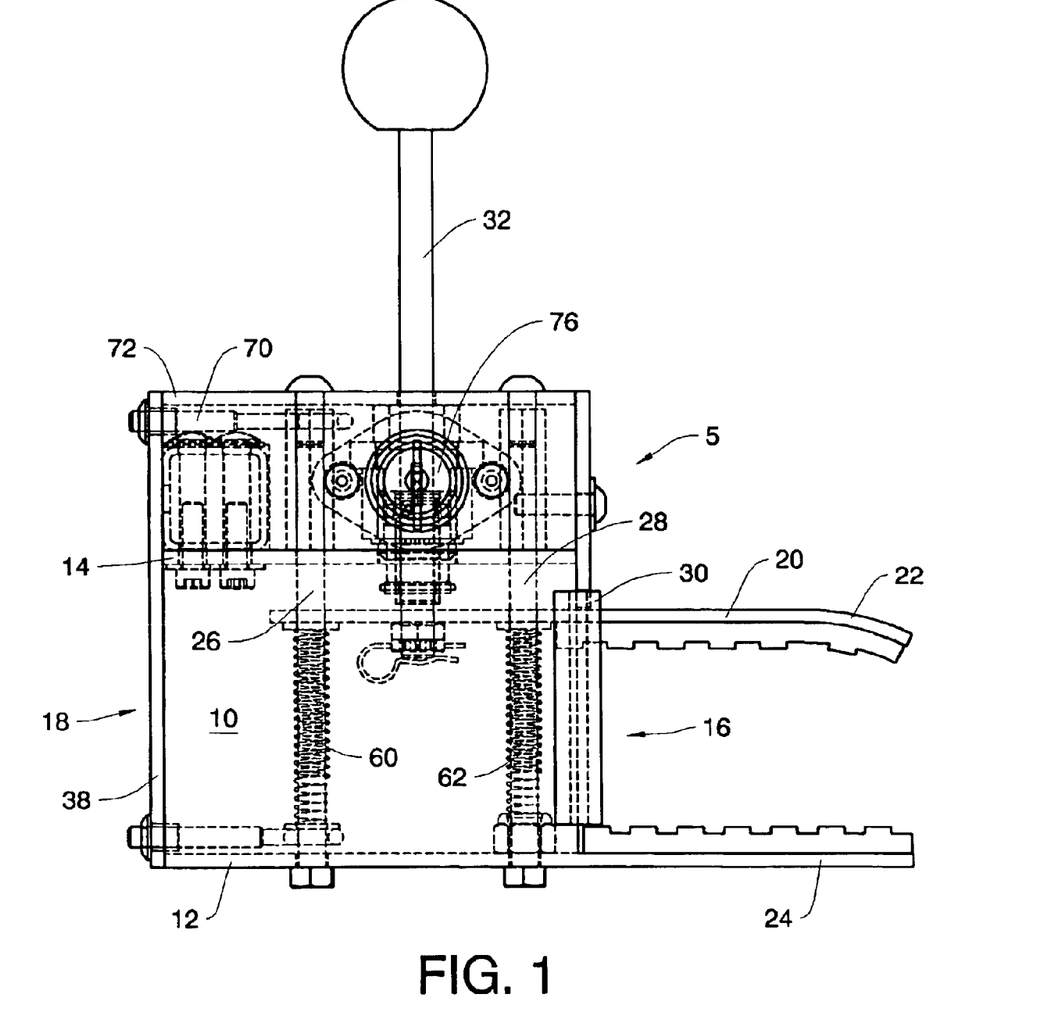
FIG. 1 illustrates a preferred embodiment of the clamp 5 with interior elements and mechanisms shown with dotted lines.
Figure 1A:
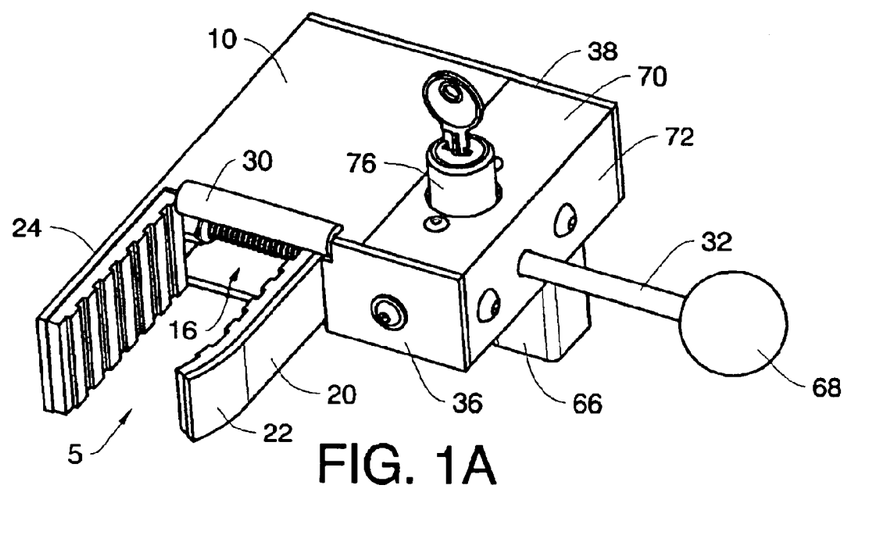
FIG. 1A illustrates a top view of a preferred embodiment of the clamp 5 without interior elements and mechanisms shown with dotted lines.
Figure 2:
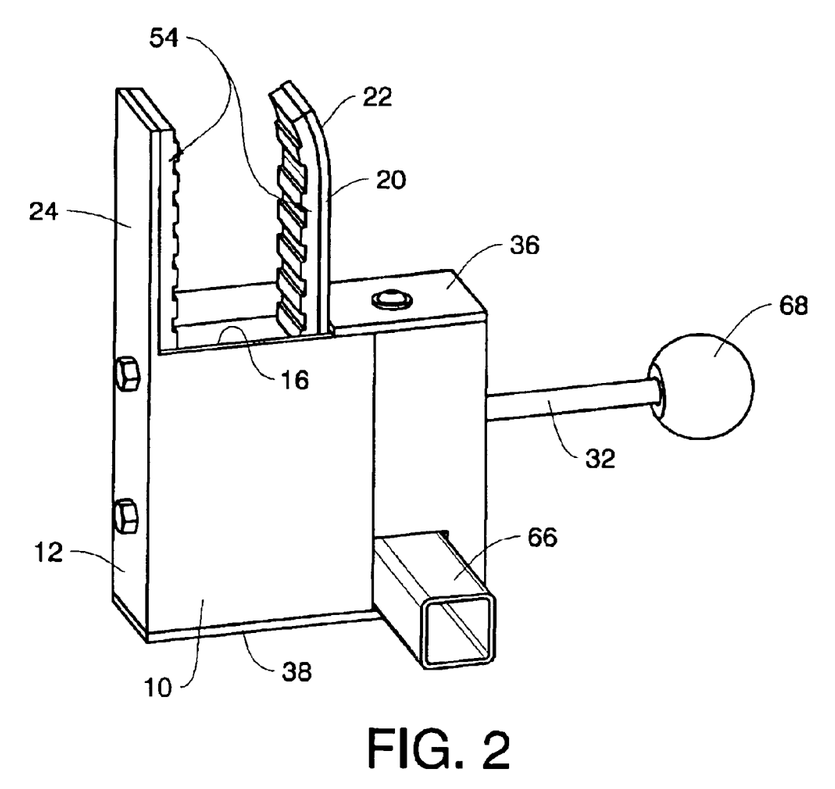
FIG. 2 illustrates a bottom view of the preferred embodiment of the clamp 5 shown in FIG. 1A.
Figure 3:
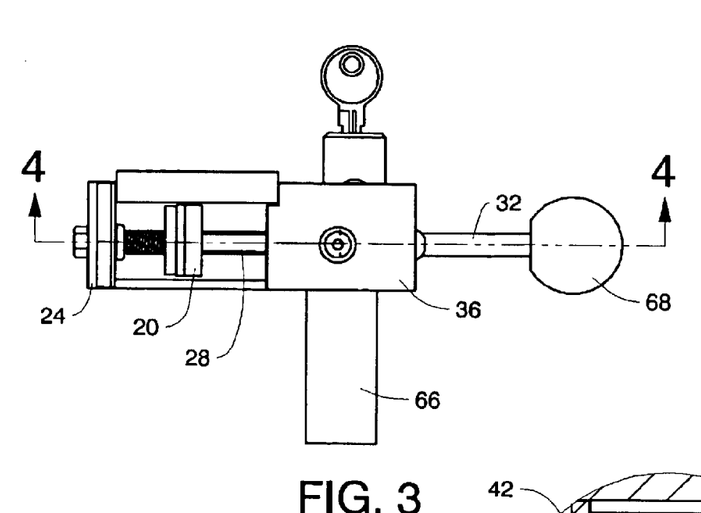
FIG. 3 illustrates a front view of the preferred embodiment of the clamp 5.
Figure 4:
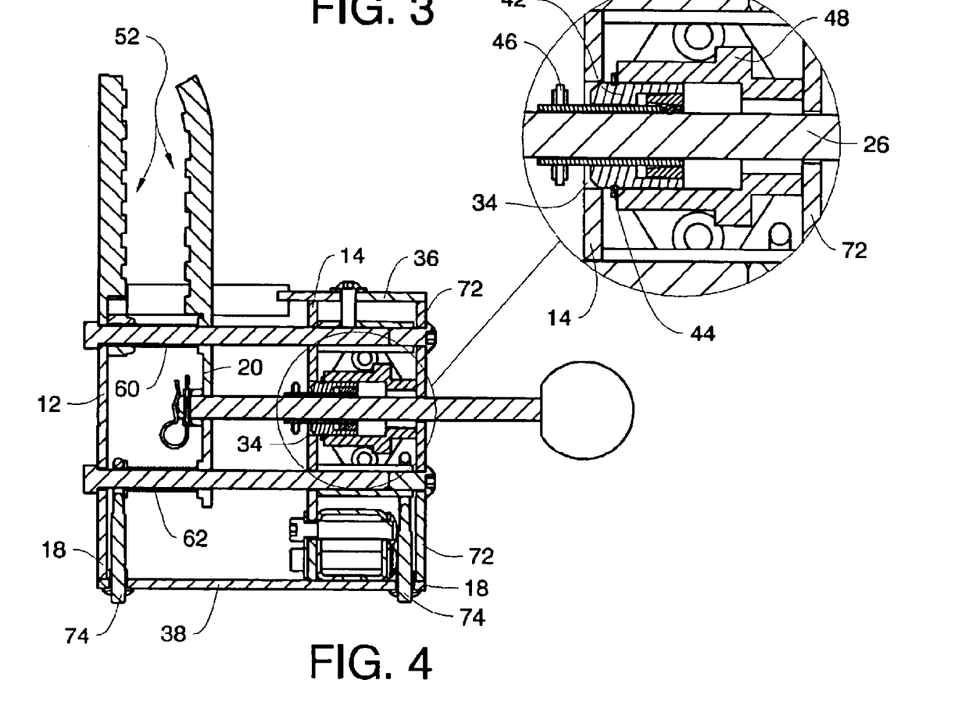
FIG. 4 illustrates section 4—4 of FIG. 3.

The sliding plate 20 protrudes through the first tube end 16 in a direction substantially parallel to the fixed plate 24. The sliding plate 20 should extend past the first tube end 16 to create a gripping surface 52 as shown in FIG. 4. It is preferred that the gripping surface 52 of the sliding plate 20 be the roughly the same size as the fixed plate 24. It is optionally preferred that the tip of the sliding plate 20 have a curved end 22 as shown in FIG. 1. It is also preferred that the sliding plate 20 be approximately 6 inches long with 3 inches extending beyond the first tube end 16. Another option is to fasten rubber padding 54 (see e.g., FIG. 2), preferably ribbed rubber padding 54, to the inside faces of the sliding plate 20 and the fixed plate 24. A rubber guard 30 can be added along the first tube end to cushion any clamped object from banging against the first tube end 16. Both the rubber padding 54 and the rubber guard 30 can be glued to the clamp 5.

The closing rod 32 is connected to the sliding plate 20 between the two alignment rods 26, 28, preferably at a point substantially equidistant between the two alignment rods 26, 28. The closing rod 32 should be aligned substantially parallel to the alignment rods 26, 28. A hole 34 in the second opposing side 14 permits the closing rod 32 to slidably pass through the second opposing side 14. It is preferred that the hole 34 be marginally bigger than the diameter of the rod-locking clamp 42 to allow the rod-locking clamp 42 to pass through the hole 34 for easier assembly of the clamp 5.

It is preferred that the rod-locking assembly 40 has a first position 56 and a second position 58. In the first position 56 (the "rod unlocked position"), the rod-locking assembly 40 permits the closing rod 32 to move the sliding plate 20 in two directions: toward the fixed plate 24 and away from the fixed plate 24. In the second position 58 (the "rod locked position"), the rod-locking assembly 40 permits the closing rod 32 to move the sliding plate only in one direction: toward the fixed plate 24.

The rod-locking assembly 40 can be configured in a variety of ways. It is preferred, however, that the rod-locking assembly comprise a rod-locking clamp 42 fixed to the second opposing side 14 and a ring tab 46 attached to the locking clamp for activating the release mechanism of the locking clamp. It is preferred to use a rod-locking clamp having a 5/16-inch rod size sold under the trademark GRIP FAST by Newman Tools, Inc. Additional information regarding the preferred rod-locking clamp can be found in U.S. Pat. No. 4,893,810 (Lee).

The preferred way to fix the rod-locking clamp 42 to the second opposing side 14 is by using a retaining ring 44. The retaining ring 44 can be added to the rod-locking clamp 42 by scoring a channel around the outside circumference of the rod-locking clamp and snapping in a metal ring to fit in the scored channel. By adding a retaining ring 44 around the outside circumference of the rod-locking clamp 42, the retaining ring can keep the rod-locking clamp from passing through the closing rod hole 34 when the closing rod 32 is depressed. The retaining ring 44 can be fastened to the second opposing side 14 by any suitable means, such as a screw. Fastening the retaining ring 44 to the second opposing side 14 keeps the rod-locking clamp 42 from moving in any direction.

Rather than fastening the retaining ring 44 to the first opposing side, however, it is preferred to enclose the rod-locking assembly in a housing 70. By enclosing the rod-locking assembly in a housing 70, the wall of the housing can be used to keep the retaining ring 44 in contact with the second opposing side 14 by the use of a spacer 48. It is preferred that the spacer be made of plastic and formed so that it fits over the rod-locking clamp 42 and extends until it touches the third opposing side 72. In other words, the combination rod-locking clamp 42 and spacer 48 is kept from moving on one side by the retaining ring 44 that bears on the second opposing side 14 and kept from moving on the other side by the third opposing side 72 of the housing 70.

Figure 5:
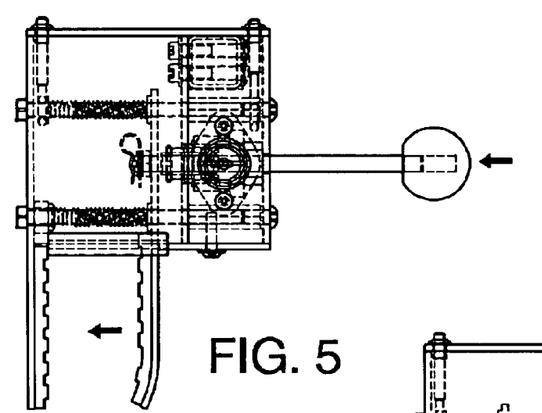
FIG. 5 illustrates a preferred embodiment of the clamp 5 in the open position.
Figure 6:
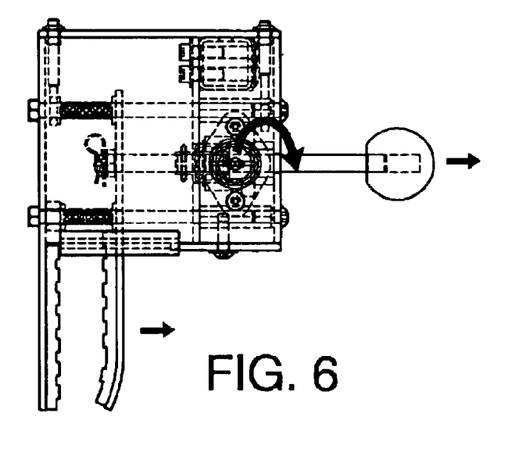
FIG. 6 illustrates a preferred embodiment of the clamp 5 in the partially closed position.
Figure 7:
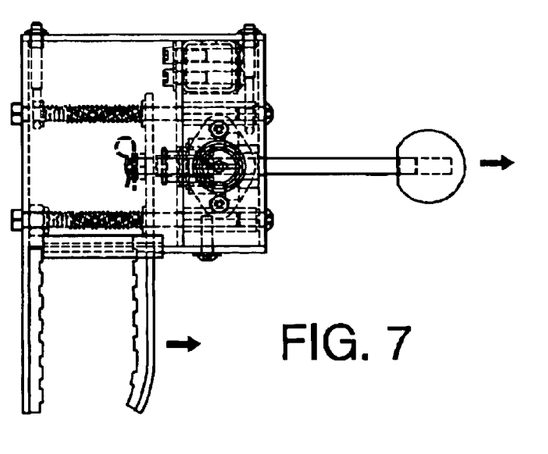
FIG. 7 illustrates a preferred embodiment of the clamp 5 in the open position.
Figure 8:
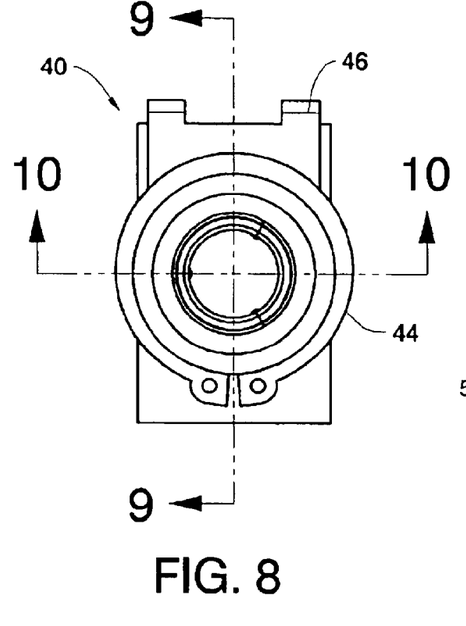
FIG. 8 illustrates an axial view of a preferred embodiment of a rod-locking assembly 40 in the "rod-locked" or second position.
Figure 9:
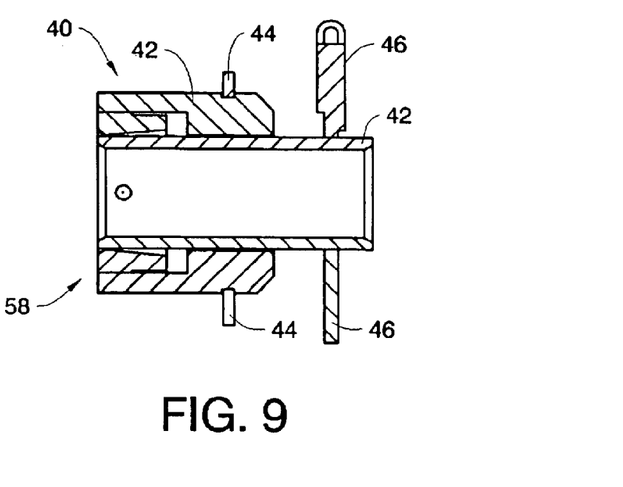
FIG. 9 illustrates section 9 from FIG. 8.
Figure 10:
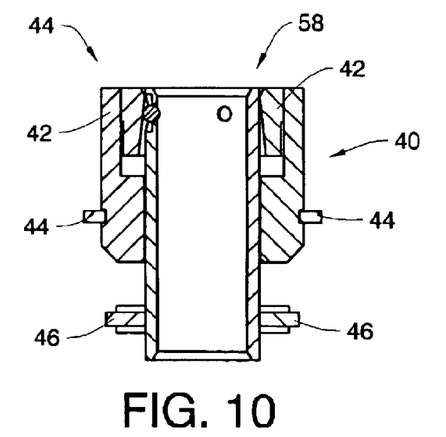
FIG. 10 illustrates section 10 from FIG. 8.
Figure 11:
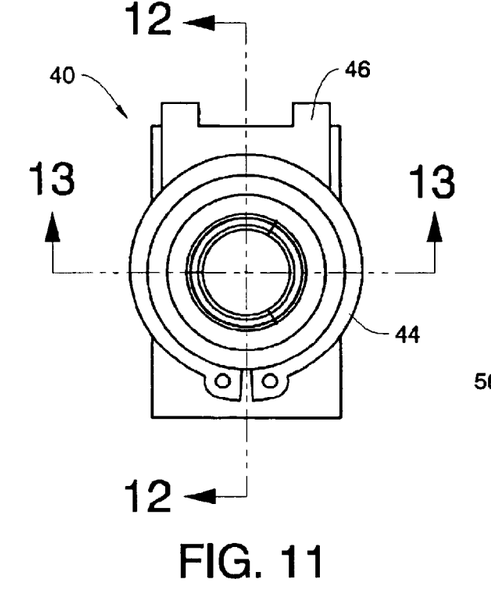
FIG. 11 illustrates an axial view of a preferred embodiment of a rod-locking assembly 40 in the "rod-unlocked" or first position.
Figure 12:
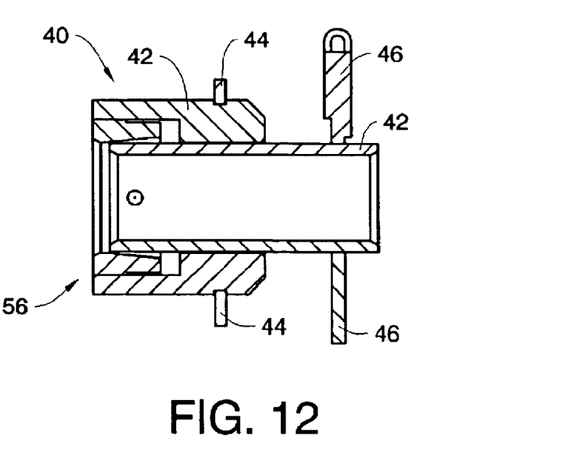
FIG. 12 illustrates section 12 from FIG. 11.
Figure 13:
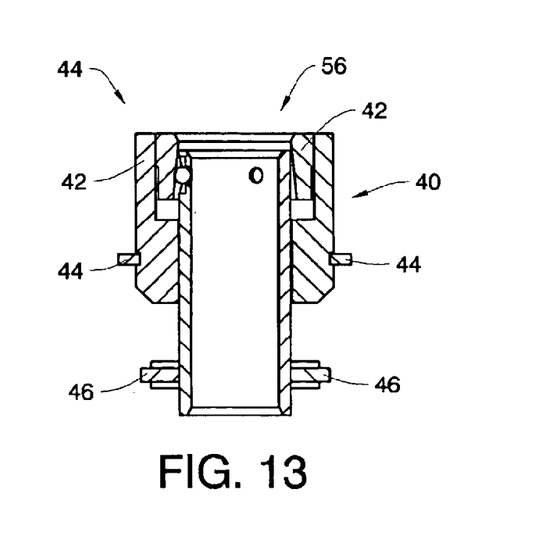
FIG. 13 illustrates section 13 from FIG. 11.

In the preferred embodiment, the rod-locking clamp 42 is converted from the second position 58 to the first position 56 by the activation of the ring tab 46. Activation of the ring tab 46 (i.e., moving the ring tab linearly in a direction away from the retaining ring 44, releases the rod-locking clamp's grip on the closing rod 32. Without the optional housing 70 (or by leaving an opening in the optional housing 70), the ring tab 46 can be activated directly by hand. If desired, the ring tab 46 can be activated by mechanical means. There are many ways known in the art to mechanically activate the ring tab 46. It is preferred, however, to utilize a keyed-locking mechanism 76 as shown in FIGS. 5, 6, and 7 to activate the ring tab 46 and so that not only is the ring tab 46 mechanically activated, but the key-locking mechanism 76 adds the capability of preventing the rod-locking clamp 42 from unintentionally being moved into the second position 58.

The clamp 5 can optionally include a releasing spring 60, 62. The releasing spring 60, 62 is preferably placed over one or more alignment rods between the fixed plate 24 and the sliding plate 20. The purpose of the releasing spring is to spring the sliding plate back in the open position when the ring tab 46 is activated (switching the rod-locking assembly from the first position to the second position) in the closed or partially closed position. The releasing spring 60, 62 provides the "quick-release" effect of the clamp.

An optional example of a rod-locking assembly 40 is illustrated in FIGS. 14A–14E. Preferably, the optional rod-locking assembly 80 comprises a locking plate 82 having an aperture through which the closing rod 32 can slide. The nose 84 of the locking plate is pivotably connected to one leg of an angle 86, with the other leg of the angle 86 being fixed to the second opposing side 14 by a fastening means, preferably a screw. A biasing spring 88 allows the locking plate to frictionally keep the closing rod 32 from moving in the direction that would increase the distance between the sliding plate 20 and the fixed plate 24 unless the end of the locking plate 82 opposite from the nose 84 is depressed. If the locking plate 82 is depressed, the releasing springs 60, 62 immediately move the sliding plate 20 into the open position.

Figure 14A:
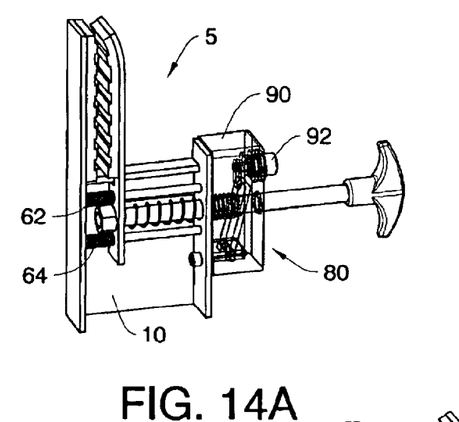
FIG. 14A illustrates an alternative embodiment of the clamp 5 in the closed position.
Figure 14B:
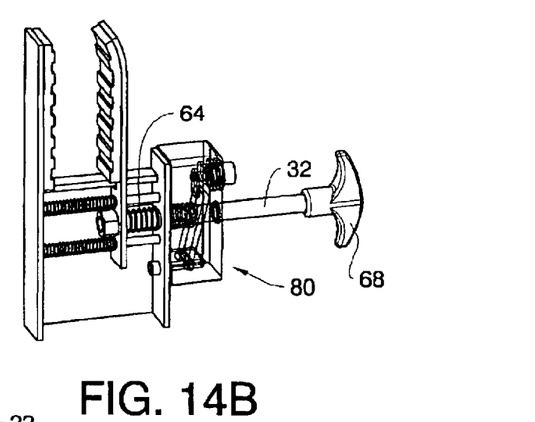
FIG. 14B illustrates an alternative embodiment of the clamp 5 in a partway-closed position.
Figure 14C:
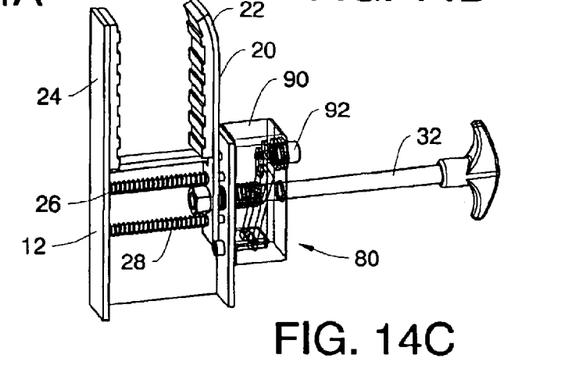
FIG. 14C illustrates an alternative embodiment of the clamp 5 in the open position.
Figure 14D:
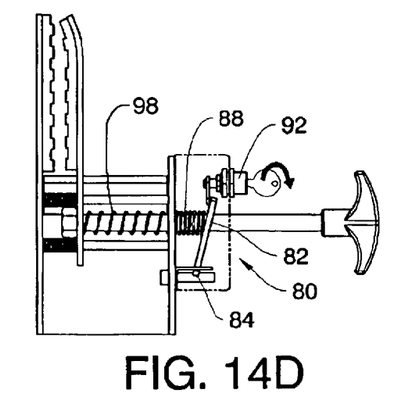
FIG. 14D illustrates an alternative embodiment of the clamp 5 with an optional locking device in the locked position.
Figure 14E:
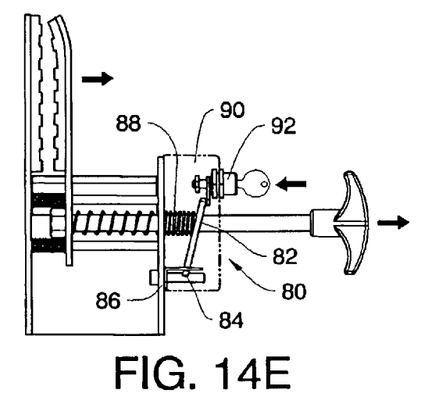
FIG. 14E illustrates an alternative embodiment of the clamp 5 with an optional locking device in the unlocked position.

The optional rod-locking assembly 80 can be enclosed by a case 90 having a button 92 for depressing the locking plate 82. The button 92 can also be capable of being locked with a key so that the locking plate 82 cannot be depressed as illustrated in FIGS. 14D and 14E.

The clamp 5 can optionally have a damping spring 98 placed over the closing rod 32 between the sliding plate 20 and the second opposing side 14. The purpose of the damping spring 98 is to soften the impact of the sliding plate on the frame 10 after activation of the releasing spring 60, 62. However, it has been found that a damping spring 98 is not necessary.

The clamp 5 can optionally have a front cover plate 36 and a back cover plate 38. The front cover plate 36 and the back cover plate 38 can be connected to the clamp 5 by an eye hook screw and nut assembly 74 or other suitable fastening means. The clamp 5 can optionally have a knob 68 for a more comfortable grip. The clamp 5 can also have a mounting tube 66 connected to the frame 10 or other suitable location so that the clamp 5 can be mounted to another object like a wall or another frame.

Figure 15:
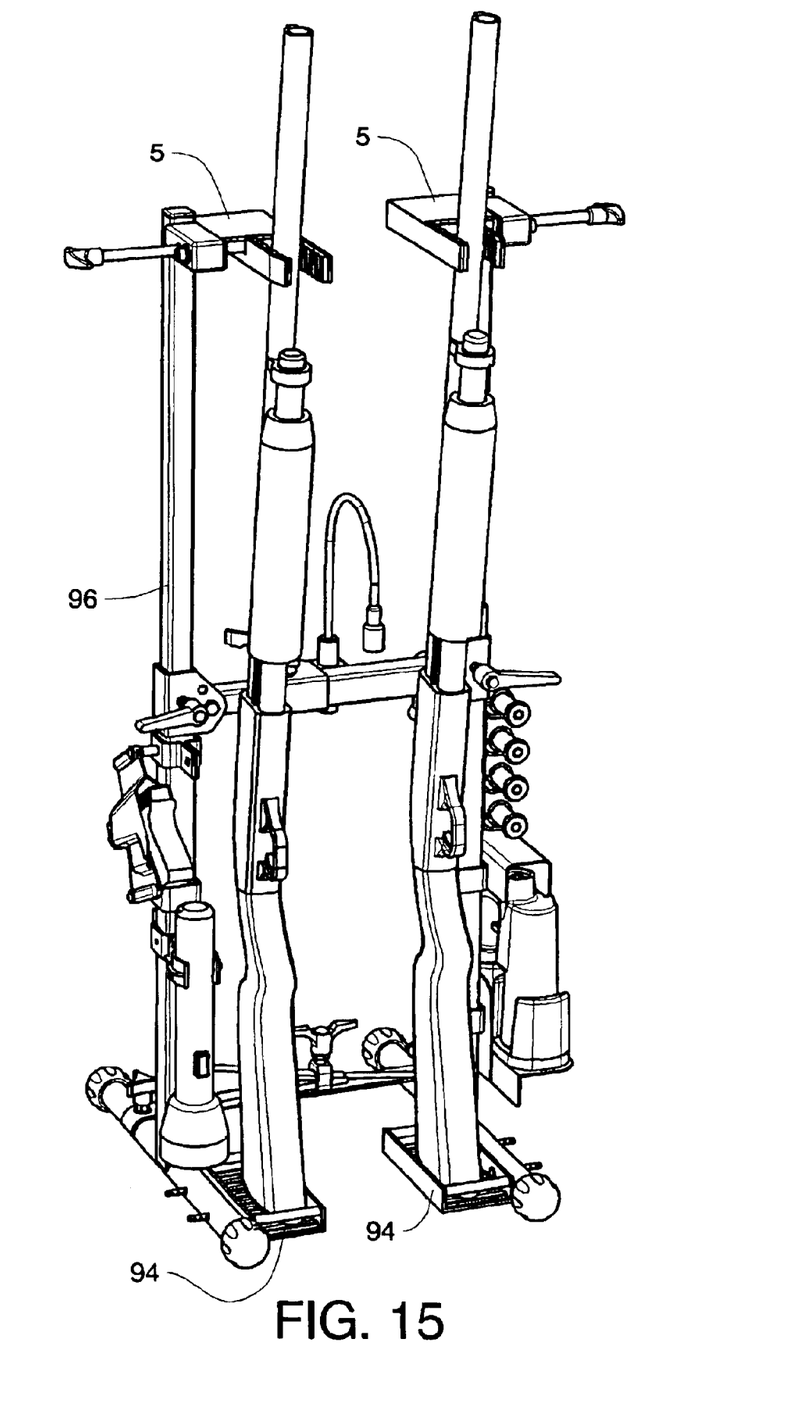
FIG. 15 illustrates a use of the clamp 5 in combination with a platform to store a long barreled gun, such as a shotgun.

While the clamp 5 can be used in a variety of ways, the clamp 5 is particularly useful when used in combination with a platform 94. As illustrated in FIG. 15, the clamp 5 can be connected to a second frame 96, wherein the second frame 96 also has a platform 94 connected to it in a location below the clamp 5. By using the clamp 5 in combination with a platform 94 a long barreled shotgun can be quickly stored by setting the base of the gun on the platform 94 when the clamp 5 is in the open or first position 56, putting the barrel of the gun between the sliding plate 20 and the fixed plate 24, and then moving the closing rod 32 to clamp the barrel. By doing so, the gun can be securely stored both quickly and easily with one hand placing the gun into position on the platform 94 and the other hand closing the clamp 5. Other objects including bicycles, tennis rackets, shovels, rakes, shotguns, rifles, flashlights can be stored in a similar manner without damaging those objects in the clamping process. The clamp does not need to be connected to a "stand alone" frame, like the second frame 96, but the clamp 5 can also be mounted to a wall, table or other structure to provide a convenient and easy way to store and mount objects.

Although the invention has been described in detail with reference to one or more particular preferred embodiments, persons possessing ordinary skill in the art to which this invention pertains will appreciate that various modifications and enhancements may be made without departing from the spirit and scope of the claims that follow.

What is claimed is:

1. A clamp comprising
    a frame having opposing sides and a first tube end, the opposing sides further comprising a first opposing side, a second opposing side,
    two alignment rods having ends, wherein the ends are connected to the opposing sides and positioned roughly perpendicular to the opposing sides,
    a fixed plate connected to the frame near the first tube end and protruding from the frame in a plane substantially parallel to the opposing sides,
    a sliding plate, wherein the two alignment rods slidably pass through the sliding plate and wherein the sliding plate protrudes past the first tube end in a direction substantially parallel to the fixed plate,
    a closing rod connected to the sliding plate and slidably passing through the second opposing side, wherein the closing rod is substantially parallel to the alignment rods and positioned between the two alignment rods, and
    a rod-locking assembly connected to the closing rod and to the second opposing side, the rod-locking assembly having a first position and a second position, the first position allowing the closing rod to move the sliding plate toward and away from the fixed plate and the second position permitting the closing rod to move the sliding plate only toward the fixed plate.

2. The clamp of claim 1, wherein the rod-locking assembly further comprises a rod-locking clamp and a retaining ring, the retaining being fastened to the second opposing side and the rod-locking clamp.

3. The clamp of claim 1, wherein the rod-locking assembly further comprises a rod-locking clamp, a spacer, a retaining ring, and a housing having a third opposing side, the retaining being fastened to the rod locking clamp and being positioned on the housing side of the second opposing side, and the spacer being between the locking clamp and the third opposing side, and the housing being connected to the frame.

4. The clamp of claim 1 further comprising an activation tab.

5. The clamp of claim 1 further comprising a releasing spring between the first opposing side and the sliding plate.

6. The clamp of claim 1 further comprising a housing connected to the clamp enclosing the rod-locking assembly.

7. The clamp of claim 1 further comprising a locking mechanism connected to the rod-locking assembly.

8. The clamp of claim 1 further comprising a damping spring between the sliding plate and the second opposing side.

9. The clamp of claim 1 wherein the fixed plate and the sliding plate protrude approximately 3 inches from the first tube end.

10. The clamp of claim 1 wherein the sliding plate has a curved end.

11. The clamp of claim 1 further comprising a rubber pad connected to the fixed plate and sliding plate.

12. The rubber padding of claim 11 wherein the rubber padding is notched.

13. The clamp of claim 1, wherein the clamp is connected to stationary object.

14. The clamp of claim 1, wherein the clamp is connected to stationary object above a fixed platform.

15. A clamp comprising a frame having opposing sides and a first tube end, the opposing sides further comprising a first opposing side, a second opposing side, two alignment rods having ends, wherein the ends are connected to the opposing sides and positioned roughly perpendicular to the opposing sides, a fixed plate connected to the frame near the first tube end and protruding from the frame in a plane substantially parallel to the opposing sides, a sliding plate, wherein the two alignment rods slidably pass through the sliding plate and wherein the sliding plate protrudes through the first tube end in a direction substantially parallel to the fixed plate, a closing rod connected to the sliding plate and slidably passing through the second opposing side, wherein the closing rod is substantially parallel to the alignment rods and positioned between the two alignment rods, a releasing spring between the first opposing side and the sliding plate, and a rod-locking assembly connected to the closing rod and to the second opposing side, the rod-locking assembly having a first position and a second position, the first position allowing the closing rod to move the sliding plate toward and away from the fixed plate and the second position permitting the closing rod to move the sliding plate only toward the fixed plate.

16. The clamp of claim 15, wherein the clamp is connected to stationary object.

17. The clamp of claim 15, wherein the clamp is connected to stationary object above a fixed platform.

18. A clamp comprising a frame having opposing sides and a first tube end, the opposing sides further comprising a first opposing side, a second opposing side, two alignment rods having ends, wherein the ends are connected to the opposing sides and positioned roughly perpendicular to the opposing sides, a fixed plate connected to the frame near the first tube end and protruding from the frame in a plane substantially parallel to the opposing sides, a sliding plate, wherein the two alignment rods slidably pass through the sliding plate and wherein the sliding plate protrudes through the first tube end in a direction substantially parallel to the fixed plate, a closing rod connected to the sliding plate and slidably passing through the second opposing side, wherein the closing rod is substantially parallel to the alignment rods and positioned between the two alignment rods, a rod-locking assembly connected to the closing rod and to the second opposing side, the rod-locking assembly having a first position and a second position, the first position allowing the closing rod to move the sliding plate toward and away from the fixed plate and the second position permitting the closing rod to move the sliding plate only toward the fixed plate, and wherein the clamp does not have a means to mechanically advance the sliding plate.

19. The clamp of claim 18, wherein the clamp is connected to stationary object.

20. The clamp of claim 18, wherein the clamp is connected to stationary object above a fixed platform.

* * * * *